(12) United States Patent
Yajima et al.

(10) Patent No.: US 12,523,906 B2
(45) Date of Patent: Jan. 13, 2026

(54) DISPLAY DEVICE

(71) Applicant: Magnolia White Corporation, Tokyo (JP)

(72) Inventors: Toshihiro Yajima, Tokyo (JP); Michihide Shibata, Tokyo (JP); Takashi Ota, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 18/975,169

(22) Filed: Dec. 10, 2024

(65) Prior Publication Data

US 2025/0102862 A1     Mar. 27, 2025

Related U.S. Application Data

(63) Continuation of application No. PCT/JP2022/036813, filed on Sep. 30, 2022.

(30) Foreign Application Priority Data

Dec. 15, 2021  (JP) .................................. 2021-203238

(51) Int. Cl.
*G02F 1/00* (2006.01)
*G02F 1/13357* (2006.01)

(52) U.S. Cl.
CPC .. *G02F 1/133606* (2013.01); *G02F 1/133603* (2013.01)

(58) Field of Classification Search
None
See application file for complete search history.

(56) References Cited

U.S. PATENT DOCUMENTS

2006/0245204 A1*  11/2006  Mizuta ............. G02F 1/133603
                                                               362/249.14
2011/0280002 A1    11/2011  Furukawa
(Continued)

FOREIGN PATENT DOCUMENTS

CN        109557722 A     4/2019
CN        110737133 A     1/2020
(Continued)

OTHER PUBLICATIONS

International Search Report and Written Opinion mailed on Nov. 22, 2022, received for PCT Application No. PCT/JP2022/036813, filed on Sep. 30, 2022, 17 pages including English Translation.
(Continued)

*Primary Examiner* — Gerald J Sufleta, II
(74) *Attorney, Agent, or Firm* — XSENSUS LLP

(57) ABSTRACT

The objective is to reduce yellow shift around a blue LED in a backlight using the blue LED and a color conversion sheet. To solve this problem, one of the structures of invention is: a display device including a display panel and a backlight, the backlight having a plurality of LEDs arranged on a substrate and a color conversion sheet arranged between the plurality of LEDs and the display panel, the color conversion sheet being formed of color conversion material and a binder, the color conversion sheet having a ring-shaped area without the color conversion material, the ring-shaped area surrounding each of the plurality of LEDs in a plan view.

8 Claims, 9 Drawing Sheets

(56) References Cited

U.S. PATENT DOCUMENTS

| | | | |
|---|---|---|---|
| 2016/0056348 A1* | 2/2016 | Lee | H10H 20/8514 |
| | | | 349/64 |
| 2018/0341151 A1 | 11/2018 | Kurita | |
| 2019/0227214 A1* | 7/2019 | Chen | G02B 6/0021 |
| 2019/0278013 A1* | 9/2019 | Huang | G02B 6/0023 |
| 2021/0026203 A1* | 1/2021 | Kim | G02F 1/133608 |

FOREIGN PATENT DOCUMENTS

| | | | |
|---|---|---|---|
| CN | 211786493 U | 10/2020 | |
| CN | 112684636 A | 4/2021 | |
| CN | 213149428 U | 5/2021 | |
| JP | 2006310043 A | 11/2006 | |
| JP | 2008103200 A | 5/2008 | |
| JP | 2011243330 A | 12/2011 | |
| JP | 2018-198187 A | 12/2018 | |
| JP | 2019-160787 A | 9/2019 | |
| JP | 2020-123752 A | 8/2020 | |

OTHER PUBLICATIONS

Japanese Office Action issued Mar. 25, 2025, in corresponding Japanese Patent Application No. 2023-567550, 14pp.

* cited by examiner

DISPLAY DEVICE

CROSS-REFERENCE TO RELATED APPLICATIONS

The present application is a continuation application of International Application No. PCT/JP2022/036813, filed Sep. 30, 2022, which claims priority to Japanese Patent Application No. 2021-203238, filed Dec. 15, 2021. The contents of these applications are incorporated herein by reference in their entirety.

BACKGROUND OF THE INVENTION

(1) Field of the Invention

This invention relates to a display device having a direct type backlight in which a large number of LEDs are arranged on a flat surface.

(2) Description of the Related Art

In a liquid crystal display (LCD) device, a thin-film transistor (TFT) substrate on which pixel electrodes, TFTs, and the like are formed in matrix form, and an opposing substrate is arranged opposite the TFT substrate, and a liquid crystal layer is sandwiched between the TFT substrate and the opposing substrate. An image is formed by controlling the transmittance of light by the liquid crystal molecules on a pixel-by-pixel basis.

Since the LCD panel itself does not emit light, a backlight is necessary. A direct back light in which a large number of light emitting diodes (LEDs) are arranged on a plane can provide a large brightness. On the other hand, white light is needed for the backlight. Therefore, there are two methods: one is to mix light emitted from LEDs of three colors to obtain the white light, and the other is to convert light from LEDs of one color to white using a light conversion sheet. In both methods, there is a task in completely mixing the light to obtain the white light.

Patent document 1 describes a configuration in which a number of single-color LEDs are arranged on a flat surface, and for each LED, a quantum dot (QD) box with a QD sheet on the inner wall and an aperture that radiates light upward is provided. In the configuration of the patent document 1, light from the LEDs is converted by the QD sheet, and light from the LEDs and the converted light are sufficiently mixed in the QD box to emit the white light through the aperture.

Patent document 1: Japanese Patent Application Laid Open No. 2018-198187

SUMMARY OF THE INVENTION

As a means of obtaining white color in backlights, the method of obtaining white color by means of a color conversion sheet using a single-color LED is often used because the structure is relatively simple. For example, mixing blue and yellow can produce a pseudo-white color. Therefore, if a color conversion sheet that converts blue to yellow is placed in the direction of the output of a blue LED, white light produced by mixing blue with yellow is emitted from the color conversion sheet.

The problem with this method is that the ratio of blue to yellow may vary from place to place, and even when white is desired to be displayed, uneven colors are likely to occur. In the patent document 1, by arranging a QD box for each LED, the white light with a sufficient mix of light in multiple wavelengths is emitted from the aperture of the QD box, but this method has a relatively complex structure.

The purpose of this invention is to obtain a white backlight with a relatively simple structure, using a single-color LED and a color conversion sheet, and with little color irregularity.

The present invention solves the above problem, and the main specific means are as follows.

(1) A display device including a display panel and a backlight, the backlight consists of a plurality of light emitting diodes arranged on a substrate, and a color conversion sheet arranged between the plurality of light emitting diodes and the display panel, the color conversion sheet being formed of color conversion material and a binder, the color conversion sheet having a ring-shaped area without the color conversion material, the ring-shaped area surrounding each of the plurality of light emitting diodes in a plan view.

(2) A display device including a display panel and a backlight, the backlight having a plurality of light emitting diodes arranged on a substrate and a color conversion sheet arranged between the plurality of light emitting diodes and the display panel, the color conversion sheet being formed of color conversion material and a binder, the color conversion sheet having, when viewed in a plane, a ring-shaped area with less color conversion material than other areas, the ring-shaped area surrounding each of the plurality of light emitting diodes.

(3) A display device including a display panel and a backlight, the backlight having a plurality of light emitting diodes arranged on a substrate and a color conversion sheet arranged between the plurality of light emitting diodes and the display panel, the color conversion sheet being formed of color conversion material and a binder, the color conversion sheet having, when viewed in a plane, the color conversion material within a first circle centered on each of the plurality of light emitting diodes, and an area outside the first circle in which no color conversion material is present, the amount of the color conversion material being greater at the center of the first circle than at the periphery of the first circle, in a plan view.

DETAILED DESCRIPTION OF THE PREFERRED EMBODIMENT

Figure 1:
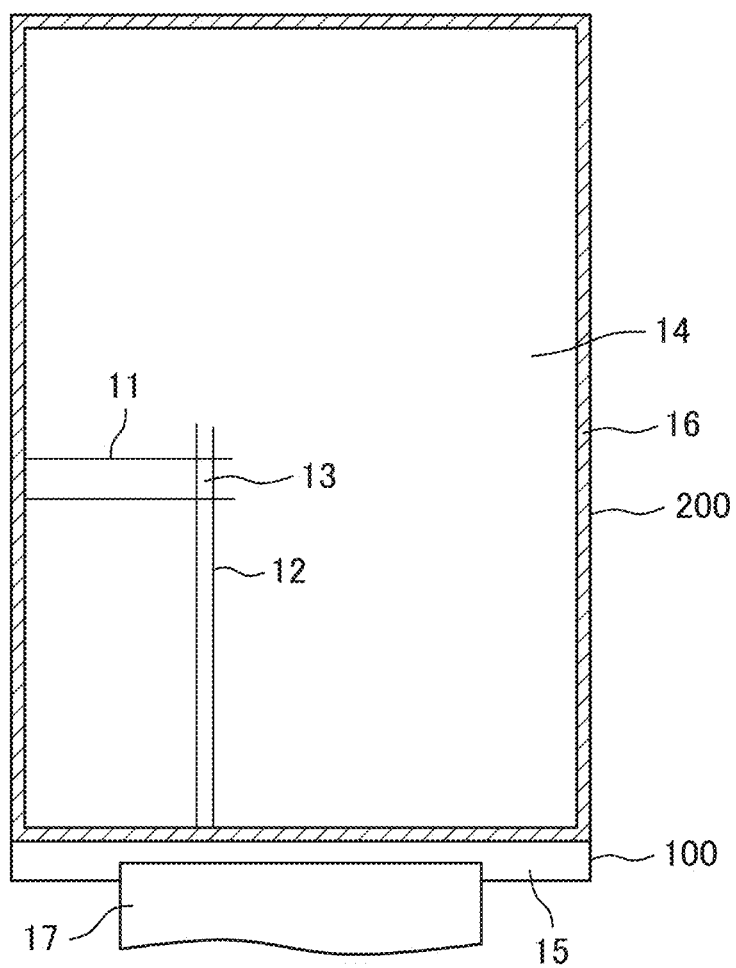
FIG. 1 is a plan view of a liquid crystal display device.

FIG. 1 is a plan view of one example of a liquid crystal display (LCD) device. In FIG. 1, a thin-film transistor (TFT) substrate 100 and an opposing substrate 200 are bonded together in the periphery thereof by a sealant 16, and a liquid crystal is sandwiched thereinside; a display area 14 is formed in the overlapped portion of the TFT substrate 100 and the opposing substrate 200. In the display area 14, scanning lines 11 extend in the horizontal direction (x direction) and are arranged in the vertical direction (y direction). Video signal lines 12 extend vertically and are aligned horizontally. A pixel 13 is formed in the area surrounded by the scanning lines 11 and the video signal lines 12.

In FIG. 1, the area where the TFT substrate 100 does not overlap with the opposite substrate 200 is a terminal area 15. The terminal area 15 is connected to a flexible wiring substrate 17 for supplying power and signals to an LCD panel. A driver integrated circuit (IC) that drives the LCD panel is mounted on the flexible wiring substrate 17.

Figure 2:
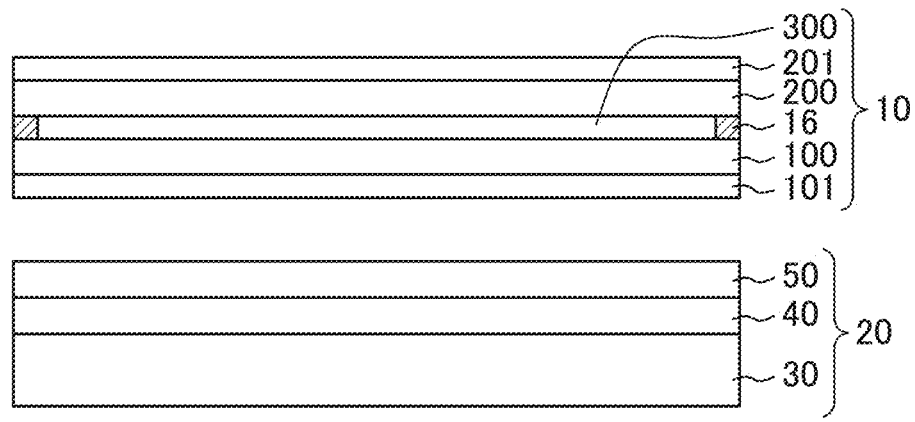
FIG. 2 is a cross-sectional view of the liquid crystal display device.

FIG. 2 is a cross-sectional view of the LCD display system. In FIG. 2, a backlight 20 is arranged behind the LCD panel 10. The LCD panel 10 has the following structure. The TFT substrate 100, on which the pixel electrodes, common electrodes, TFT, scanning lines, video signal lines, etc. are formed, is placed opposite to an opposing substrate 200, on which the black matrix and color filters are formed. Liquid crystal 300 is sealed thereinside.

The liquid crystal molecules are initially oriented by the alignment films formed on the TFT substrate 100 and the opposite substrate 200. When voltage is applied between the pixel electrodes and the common electrode, the liquid crystal molecules rotate to form an image by controlling the light from the backlight 20 for each pixel. Since the liquid crystal 300 can control only deflected light, a lower polarizer 101 is placed under the TFT substrate 100 to allow only deflected light to enter the liquid crystal 300. The light modulated by the liquid crystal 300 is detected by an upper polarizer 201, and the image is viewed.

In FIG. 2, the backlight 20 is located behind the LCD panel 10. The backlight 20 consists of a color conversion sheet 40 placed above a light source 30 and an optical sheet group 50 placed above it. There are two types of the backlight 20 for display devices: the sidelight type, in which a light source such as a light emitting diode (LED) is arranged on the side of the light guide plate, and the direct-light type, in which a light source such as LED is arranged on the underside of the light guide plate.

In FIG. 2, the color conversion sheet 40 is placed above the light source 30. The composition of the color conversion sheet will be explained later. Above the color conversion sheet 40 is the optical sheet group 50. Prism sheets, diffusion sheets, etc. are used for the optical sheet group 50. In addition, a deflection reflection sheet may be used to improve the efficiency of light utilization from the backlight 20. What kind of optical sheet is used or how many optical sheets are used is determined by the display device.

Figure 3:
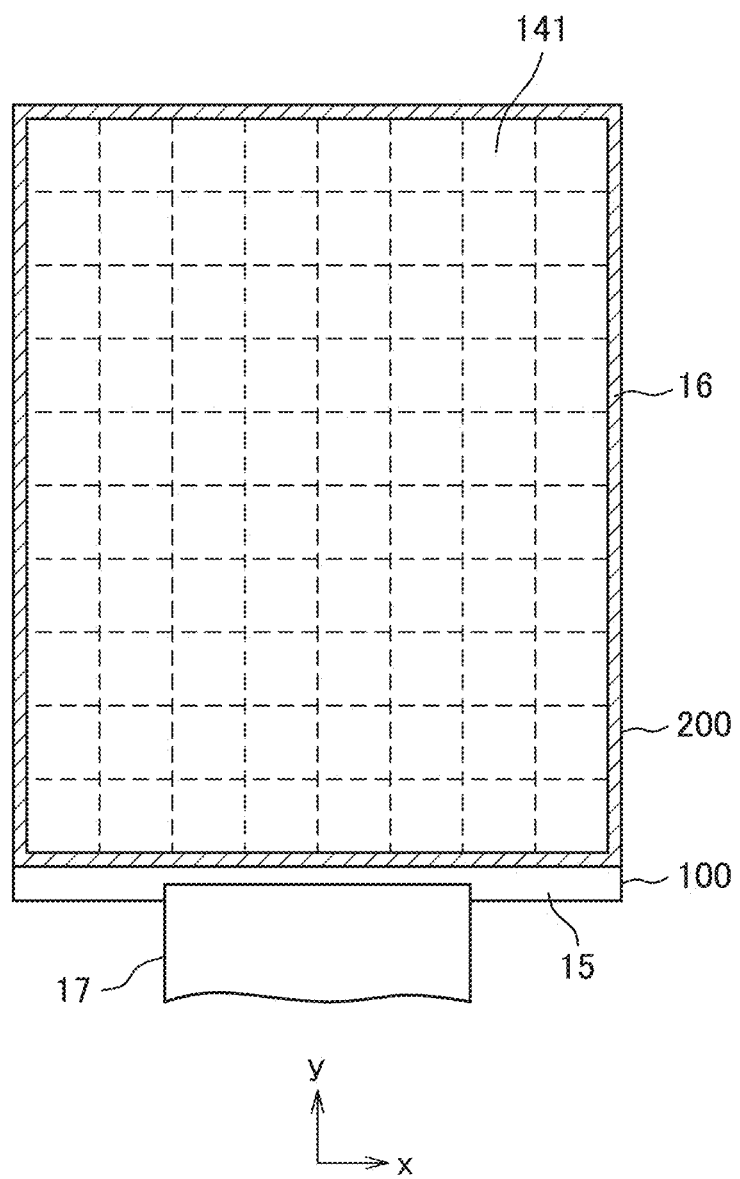
FIG. 3 is a plan view of an example of segments in the liquid crystal display.
Figure 14:
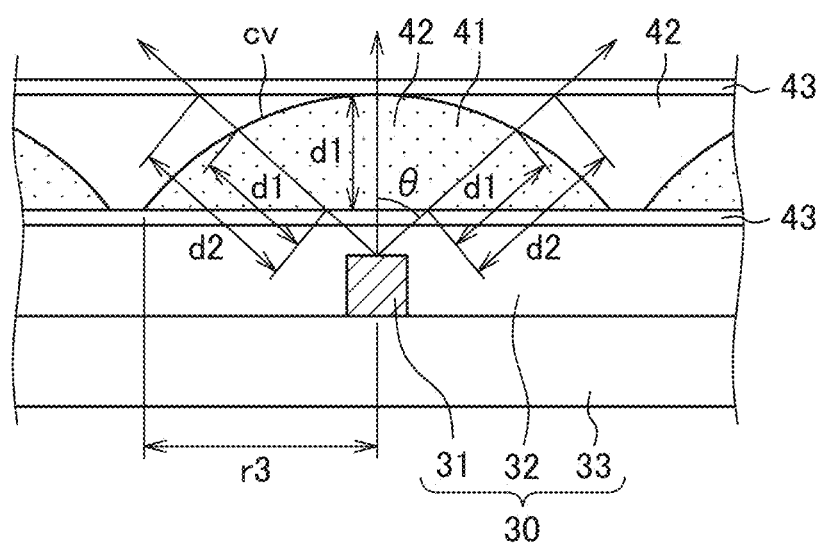
FIG. 14 is a cross-sectional view of Embodiment 3.

FIG. 3 depicts a plan view of the LCD panel with the display area divided into segments 141. LEDs are arranged in the backlight for each of the 141 segments. FIG. 14 is a schematic diagram; and actual display panel is divided into more segments than FIG. 3. The size of each segment is less than 4 mm, often 2 mm. The dotted lines indicating segments in FIG. 3 are imaginary lines, and there are no such lines in the display area.

In FIG. 3, the LEDs, which are the light sources, are placed at the center of each segment. In other words, the LEDs are viewed in a plane and are arranged on the circuit board in a matrix with equal intervals in the x- and y-directions. In other words, they are arranged at the vertices of a square.

Figure 4:
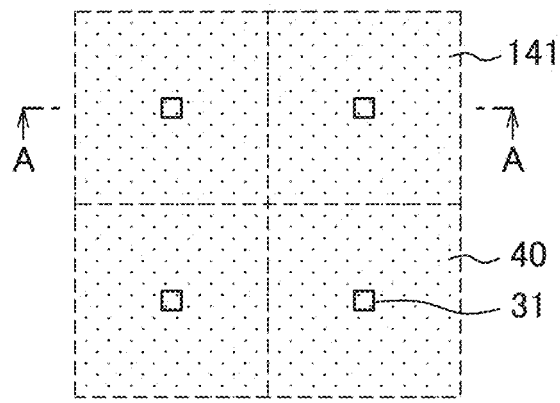
FIG. 4 is a plan view of four segments in a backlight.

FIG. 4 is a plan view depicting the four segments 141 depicted in FIG. 3. In FIG. 4, a LED 31 is placed in the center of the segment 141. As depicted in FIG. 4, the LED 31 can be said to be placed at the apex of a square, and the color conversion sheet 40 is placed over the LED 31. One sheet is used as the color conversion sheet 40 for the common display area. The dotted line in FIG. 4 is an imaginary line indicating the boundary of the segment 141.

Figure 5:
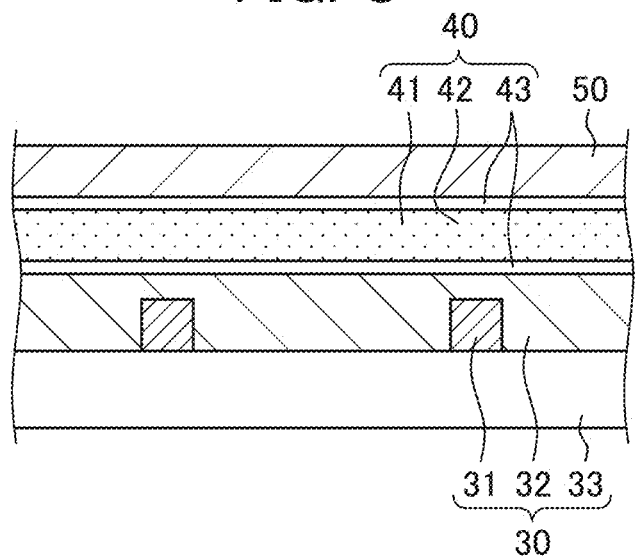
FIG. 5 is an A-A cross-sectional view of FIG. 4.

FIG. 5 is a cross-sectional view depicting the configuration of the backlight, corresponding to the A-A cross-sectional view in FIG. 4. In FIG. 5, the LED 31 is placed on a circuit substrate 33 for the backlight. The LED 31 is a blue light-emitting diode (hereinafter referred to as blue LED). The LED 31 is covered by a transparent resin 32. The transparent resin 32 is made of acrylic resin or silicone resin, for example.

In FIG. 5, the LEDs 31 are covered by the transparent resin 32, the color conversion sheet 40 is placed on the transparent resin 32. The color conversion sheet 40 may use, as the color conversion material 41, a phosphor sheet in which phosphor particles are dispersed or a quantum dot sheet (QD sheet) in which quantum dots (QDs) are dispersed. In FIG. 5, a QD sheet is used.

As depicted in FIG. 5, the color conversion sheet (QD sheet) 40 is a transparent binder 42 in which QDs 41 are dispersed, being sandwiched between thin transparent resin films 43 that also serve as a barrier layer. Acrylic, polycarbonate, or polyethylene terephthalate (PET) is used for the thin transparent resin film 43 as the barrier layer. The overall thickness of the color conversion sheet 40 is 80 microns to the 300 microns.

Figure 6:
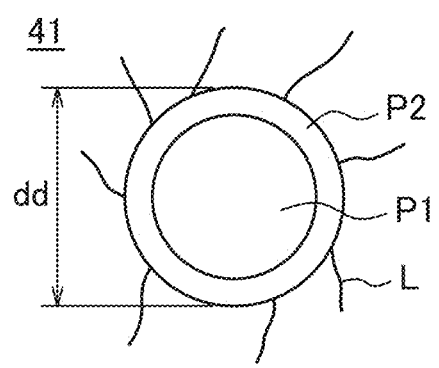
FIG. 6 is an example of quantum dots.

FIG. 6 is a schematic diagram of the QDs 41 used in FIG. 5. The QDs 41 are semiconductor microparticles, and the wavelength of light that is converted and emitted differs depending on the size of the particle diameter. The diameter dd of the QD is generally less than 20 nm. In FIGS. 6, P1 and P2 are semiconductors; P1 is a spherical cadmium selenide (CdSe), for example, and P2, which is zinc sulfide (ZnS), surrounds P1.

The QDs 41 confine incident light and emit light of longer wavelength than the incident light. The incident light is from the LED 31, which may be blue light or ultraviolet light. In this example, the light from the LED 31 is the blue light. The L in the QD 41 in FIG. 6 is a ligand, which facilitates dispersion of the QD 41 in the resin. The QD 41 depicted in FIG. 6 is dispersed in the transparent resin 42 called a binder. For example, silicone resin, epoxy resin, etc. can be used as the resin used as the binder 42.

Figure 7:
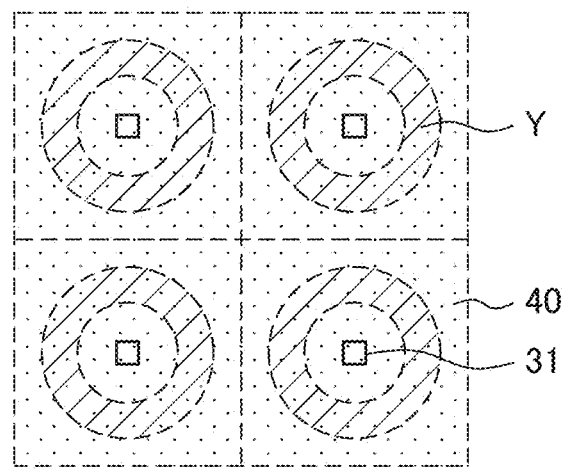
FIG. 7 is a plan view illustrating a yellow shift.
Figure 8:
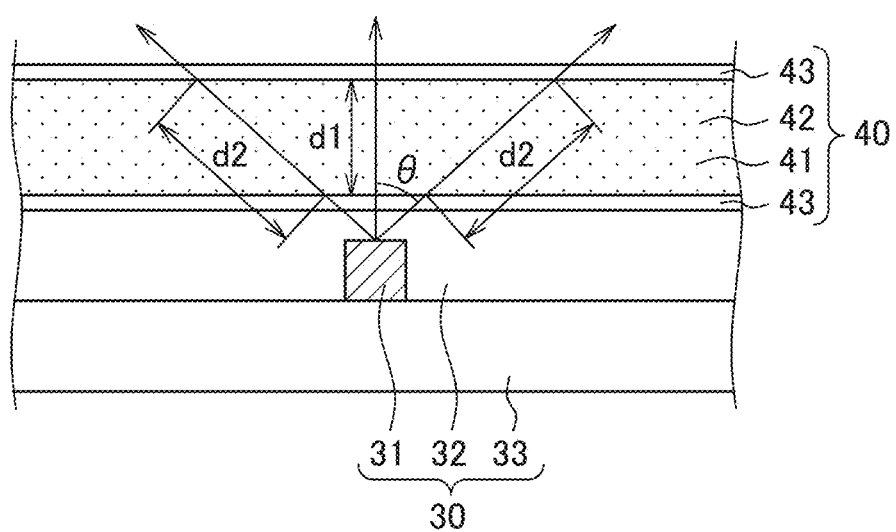
FIG. 8 is a cross-sectional view illustrating the yellow shift.

FIGS. 7 and 8 illustrate problems with the backlight depicted in FIGS. 4 and 5. FIG. 7 depicts the light emission pattern from the color conversion sheet 40 when the LED 31 is turned on in the same four segments as in FIG. 4. The configuration of FIG. 7 is the same as that in FIG. 4, with the color conversion sheet 40 placed above the LED 31. The blue light is emitted from the LED 31, some of which is converted to yellow light by the QDs 41, and the rest is emitted as the blue light, which is designed to emit white light as a whole.

In reality, however, as depicted in FIG. 7, a yellowish region Y appears in the periphery of the LED 31 when viewed in a plane. This region is henceforth also referred to as the yellow-shifted region. This region is, for example, the hatched ring shape in FIG. 7. FIG. 7 is a schematic diagram, and the yellow-shifted region does not have a clear boundary. The dotted circle in FIG. 7 depicts the approximate area where the yellow shift occurs.

FIG. 8 is a cross-sectional view of one segment of the backlight. In FIG. 8, the optical sheet group is omitted. In FIG. 8, a blue LED 31 is placed on the circuit substrate 33, and the transparent resin 32 covers the blue LED 31. The color conversion sheet 40 is placed over the transparent resin 32. The color conversion sheet 40 consists of the QDs 41 dispersed in the binder 42 and sandwiched between the transparent barrier layers 43.

As depicted in FIG. 8, light traveling in the normal direction of the color conversion sheet 40 from the LED 31 and light traveling at an angle θ to the normal direction differ in the distance they travel in the color conversion sheet 40. The distance that the light traveling in the normal direction travels in the color conversion sheet 40 is d1, and the distance that the light traveling at an angle θ with respect to the normal direction travels in the color conversion sheet 40 is d2, where d2>d1.

In other words, light traveling in an angle θ with respect to the normal direction has a greater probability of being captured by the QDs 41, and thus a greater probability of the blue light being converted to the yellow light. This phenomenon depends on the magnitude of the angle θ. It becomes noticeable to the human eye when the angle θ is larger than a certain value. On the other hand, since the cause of the yellow shift is the ratio of the blue light to the yellow light, when the angle θ becomes even larger, the blue light itself becomes more scattered, and the amount of the blue light converted to the yellow light becomes competitive again, resulting in the phenomenon of the emitted light returning to white. In other words, of the light from the LED 31 that travels at an angle θ with the normal direction of the color conversion sheet 40, light with a certain range of angle θ will become yellowish.

The present invention solves the above problems. The following embodiments illustrate the invention in detail.

Embodiment 1

Figure 9:
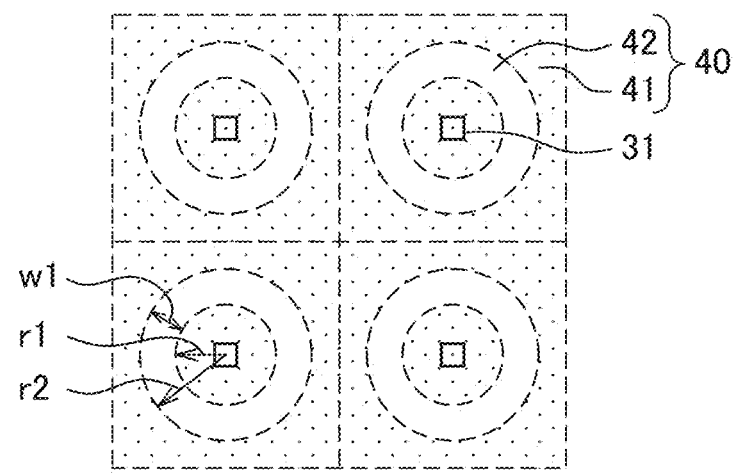
FIG. 9 is a plan view of Embodiment 1.

FIG. 9 is a plan view of the features of Embodiment 1. FIG. 9 is a plan view of four segments corresponding to FIG. 7. FIG. 9 depicts the LEDS 31 not yet turned on. In FIG. 9, as in FIG. 7, the LED 31 is located in the center of the segment, and the color conversion sheet 40 is placed over the LED 31. The difference between FIG. 9 and FIG. 7 is that the QDs 41 in the color conversion sheet 40 are not present in the ring-shaped region corresponding to the yellow shift region in FIG. 7.

In other words, only the binder 42 formed of transparent resin is present in this ring-shaped region. Then, in this ring-shaped region of the color conversion sheet 40, the blue light is not subjected to color conversion by the QDs 41, so that the blue light becomes predominant over the yellow light and the yellow shift is reduced. In FIG. 9, in the color conversion sheet 40, the area where the QD 41 does not exist is a ring-shaped area of width w1 between radii r1 and r2 from the center of the segment.

Figure 10:
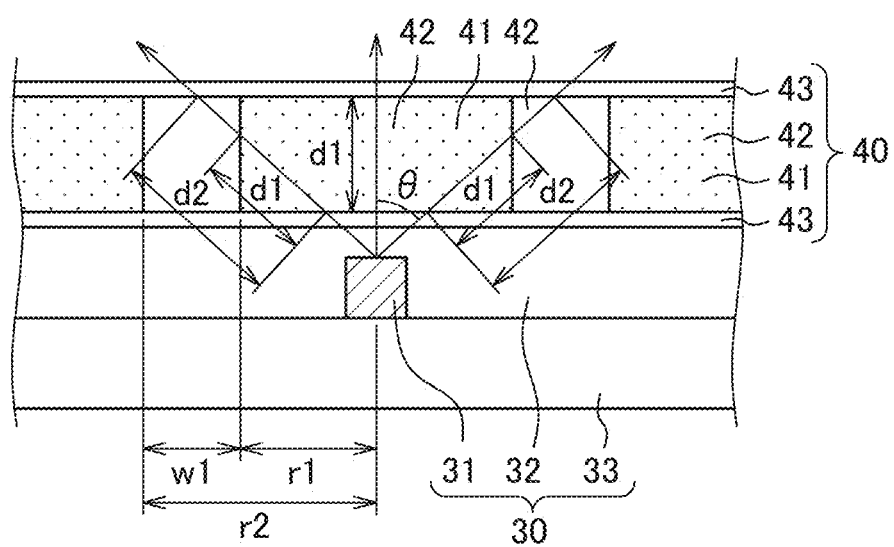
FIG. 10 is a cross-sectional view of Embodiment 1.

FIG. 10 is a cross-sectional view of one segment of the backlight, corresponding to FIG. 9. In FIG. 10, the optical sheet group is omitted. The configuration of FIG. 10 is similar to that of FIG. 8, except for the color conversion sheet 40. In FIG. 10, as in FIG. 8, the distance that light traveling in the normal direction travels in the color conversion sheet 40 is d1, and the distance that light traveling at an angle θ with respect to the normal direction travels in the color conversion sheet 40 is d2, with d2>d1.

The difference between FIG. 10 and FIG. 8 is that the color conversion sheet 40 is a region with no QDs 41 over a width w1 between radii r1 and r2. Therefore, light traveling in an angle θ with respect to the normal direction travels a distance d1 in the area where the QDs 41 exist in the color conversion sheet 40, and then travels through the area where QDs 41 do not exist.

Therefore, the range in which light traveling at an angle θ to the normal direction of the color conversion sheet 40 is affected by the QDs 41 is the same distance d1 as the travel distance of the light traveling in the normal direction. In other words, if the color conversion sheet depicted in FIG. 10 is used, no yellow shift will occur.

By the way, in the color conversion sheet 40 of FIGS. 9 and 10, the QDs 41 exist outside the radius r2. Otherwise, light traveling at a large angle θ with the normal direction of the color conversion sheet 40 will emit only the blue light without being affected by the QDs 41 in the color conversion sheet 40, consequently a blue shift will occur in this range.

In FIG. 10, the optimal region in the color conversion sheet 40 where no QDs 41 exist, i.e., the optimal width w1 between radii r1 and r2, depends on the angle θ with the normal direction of the color conversion sheet. In addition, light actually travels in the color conversion sheet 40, with being scattered rather than traveling in a straight line.

In other words, FIG. 10 depicts the basic concept of preventing the yellow shift. In the color conversion sheet 40, the area without the actual ring of the QDs 41, i.e., the area of width w1 between radii r1 and r2, is designed so that the yellow shift Y depicted in FIG. 7 is least noticeable, taking various angles θ into account.

The advantage of Embodiment 1 is that the yellow shift can be counteracted by the dimensions of the area in which the QDs 41 are present in the color conversion sheet 40, rather than by changing the density of the QDs 41. This configuration is easy to manufacture compared with a case where the density of the QDs 41 is varied within the color conversion sheet 40. For example, as a manufacturing method for the color conversion sheet 40 of Embodiment 1, the color conversion sheet 40 containing the QDs 41 with many ring-shaped holes arranged in matrix can be made, and then the ring-shaped holes can be filled with the binder 42.

In FIG. 7, the area of the yellow shift is a circular ring, but depending on the distribution of light from the LED 31 as the light source, it may be other than a circle, for example, an oval, or a rectangle with rounded corners. In such a case, the area without the QDs 41 on the color conversion sheet 40 is also an ellipse or a rectangular ring with rounded corners.

Embodiment 2

Figure 11:
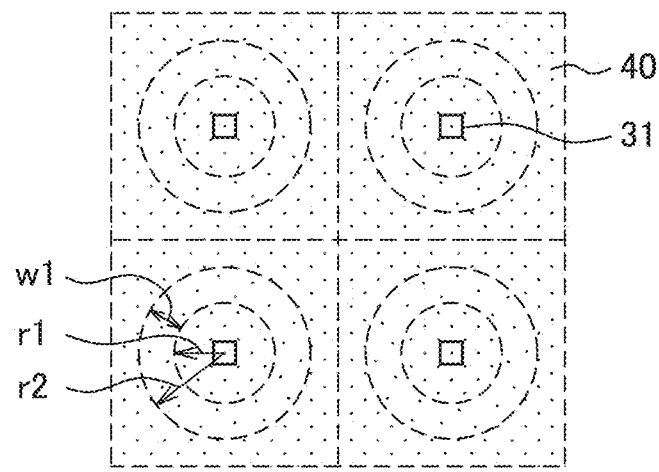
FIG. 11 is a plan view of Embodiment 2.

FIG. 11 is a plan view depicting the features of Embodiment 2. FIG. 11 is a plan view of four segments corresponding to FIG. 7. In FIG. 11, the LEDs 31 are not yet turned on. In FIG. 11, as in FIG. 7, the LED 31 is located in the center of the segment, and the color conversion sheet 40 is placed over the LED 31. The difference between FIG. 11 and FIG. 7 is that in the ring-shaped area corresponding to the yellow shift area in FIG. 7, the amount of the QDs 41 in the color conversion sheet 40 is small. The meaning of the small amount of the QDs 41 is not the density of the QDs 41, but rather that there is a range in the thickness direction of the color conversion sheet 40 in which no QDs 41 exist, as depicted in FIG. 12.

Figure 12:
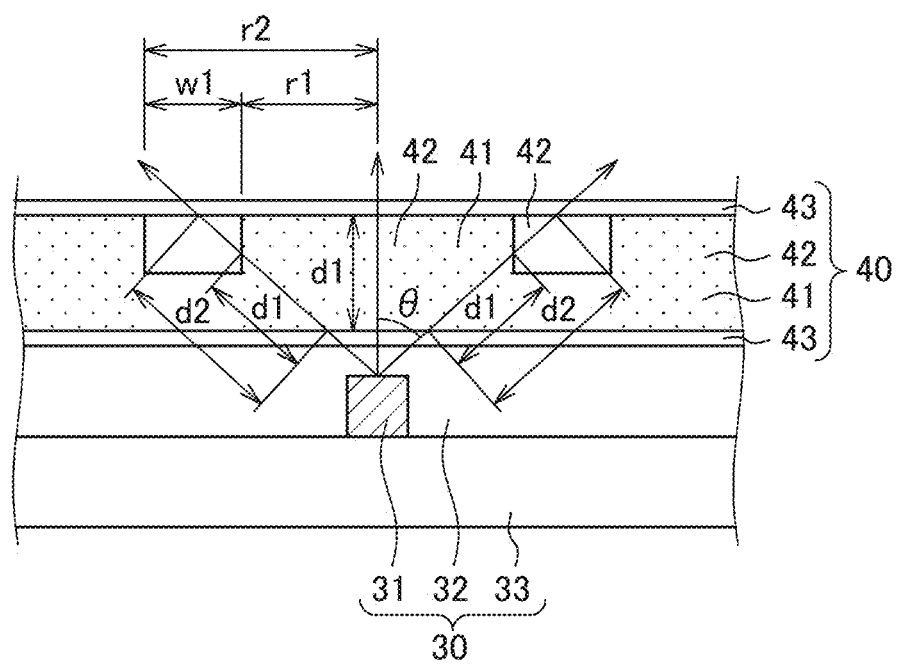
FIG. 12 is a cross-sectional view of Embodiment 2.

FIG. 12 is a cross-sectional view of one segment of the backlight, corresponding to FIG. 11. The difference between FIG. 12 and FIG. 10 of Embodiment 1 is only the color conversion sheet 40. In the color conversion sheet 40 of FIG. 12, unlike FIG. 10, in the region of width w2 between radii r1 and r2, the QDs 41 exist from the bottom surface of the color conversion sheet 40 to height h1 as in other regions, but no QDs 41 exist on the top surface side beyond h1.

As depicted in FIG. 12, the same effect as in FIG. 10 is obtained for light incident at an angle θ to the normal direction of the color conversion sheet 40. In other words, the yellow shift is suppressed. On the other hand, for light incident at an angle greater than the angle θ with the normal direction of the color conversion sheet 40, the effect is different between Embodiment 2 depicted in FIG. 12 and Embodiment 1 depicted in FIG. 10. That is, for light incident at an angle greater than the angle θ with the normal direction of the color conversion sheet 40, the QDs 41 are affected for a longer distance in FIG. 12 than in FIG. 10.

This is because in the color conversion sheet 40 of FIG. 12, in the region of width w1, the QDs 41 exist from the bottom side to the height of h1. The presence of the QDs 41 from the lower side to the height of h1 can change the width or the position of the ring to reduce the yellow shift in FIG. 7. In other words, in Embodiment 2, the degree of freedom of design can be increased to reduce the yellow shift in FIG. 7.

Embodiment 3

Figure 13:
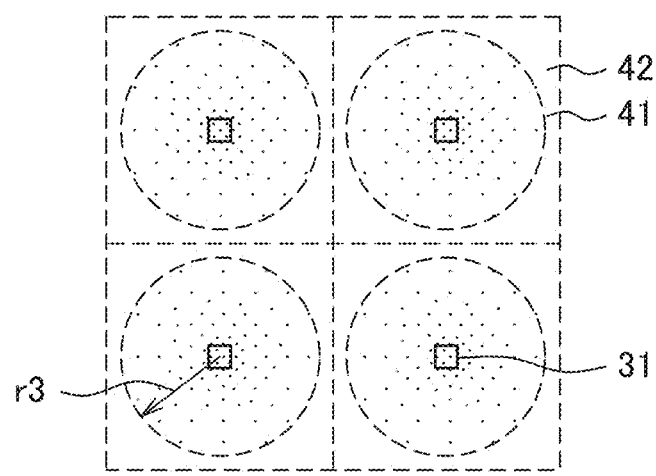
FIG. 13 is a plan view of Embodiment 3.

FIG. 13 is a plan view of Embodiment 3 and FIG. 14 is a cross-sectional view of Embodiment 3. FIG. 13 is a plan view of the four segments corresponding to FIG. 7. FIG. 13 depicts the LEDs 31 not yet turned on. In FIG. 13, as in FIG. 7, the LED 31 is positioned in the center of the segment, and the color conversion sheet 40 covers the LED 31. The difference between FIG. 13 and FIG. 7 is that the area where the QDs 41 are present is within a radius r3 from the center of the segment, and that within this area, the amount of the QDs 41 gradually decreases from the center to radius r3.

FIG. 14 is a cross-sectional view of the backlight corresponding to one segment corresponding to FIG. 13. However, in the color conversion sheet 40, a portion of the area where the QDs 41 corresponding to the adjacent segment are present is also described. In the color conversion sheet 40 in FIG. 14, directly above the LED 31, the QDs 41 are formed over the entire thickness direction of the color conversion sheet 40. As one moves away from the center, the range of QDs 41 in the thickness direction of the color conversion sheet 40 becomes smaller and becomes zero at a radius r3 from the center. In other words, outside the radius r3 from the center, there are no QDs 41 and only the transparent binder 42 exists. However, as depicted in FIG. 14, just outside of r3, there is a region where the QD 41 corresponding to the adjacent segment is formed, so that the region of only the transparent binder 42 is not very wide.

In FIG. 14, the distance at which light from the LED 31 to the normal direction of the color conversion sheet 40 is scattered by the QDs 41 is d1. The distance at which the blue light from the LED 31 toward the direction that makes an angle θ with the normal direction of the color conversion sheet 40 is scattered by the QDs 41 is also d1. Therefore, the amount of the blue light scattered by the QD 41 is the same for both the blue light, and in principle, no color shift occurs.

In FIG. 14, the area where the QDs 41 exist is set so that even when the angle θ that the blue light from the LED 31 makes with the normal direction of the color conversion sheet 40 changes, the distance where the blue light is scattered by the QDs 41 is almost the same as d1. Conversely, in FIG. 14, the curve cv that defines the formation area of the QD 41 is set so that the distance at which the blue light is scattered by the QD 41 is almost the same as d1 for various angles θ.

In FIG. 14, if the angle θ that the blue light from the LED 31 makes with the normal direction of the color conversion sheet 40 becomes very large, it may be difficult to ensure that the distance d1 at which the blue light is scattered by the QDs 41. However, the LED 31 as the light source also has directivity in its emission angle, and light with an extremely large angle θ has a very limited amount of light. Therefore, the effect of such light is minor, and it is possible to prevent color shift from occurring.

In Embodiment 3, as depicted in FIG. 13, the amount of the QDs 41 is gradually reduced from the center of the segment to the periphery, but this is achieved by defining the formation range of QDs 41, rather than by changing the density of the QDs 41. Therefore, compared to the case where the density of the QDs 41 is varied, manufacturing is easy and the characteristics can be stabilized.

Embodiment 4

In Embodiments 1 through 3, the shape of the segment is quadrilateral. On the other hand, as depicted in FIG. 7, the range of the yellow shift is a circular ring shape. Then, the yellow shift measures explained in Embodiments 1 through 3 have different effects in the diagonal direction of the segment and on the axis. The yellow shift countermeasures described in Embodiments 1 through 3 are most effective when the segment shape is a circle. However, when the segment is a circle, it cannot be the most densely packed. The method to make the segments more closely resembling a circle and to achieve the tightest packing is to make the segment shape hexagonal, i.e., a honeycomb structure.

By the way, the dotted lines that indicate the boundaries of the segments in FIG. 3 are imaginary lines, so that changing the shape of the segments does not affect the configuration of the display panel. It is sufficient to position the LED 31 at the center of the segment in the plane so that it fits the honeycomb structure. In other words, if the LED 31 is positioned at the apex of a regular triangular shape, the corresponding segment will have a honeycomb structure. The range in which the QDs 41 exist or do not exist, as explained in Embodiments 1 through 3, can be set based on the LED 31 at the center of the segment.

Figure 15:
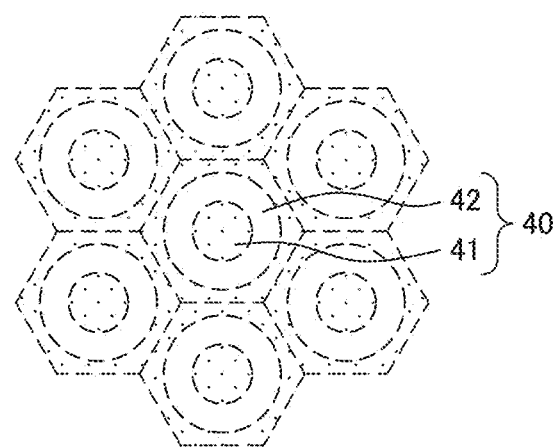
FIG. 15 is a plan view of Embodiment 4.

FIG. 15 is a plan view of the color conversion sheet 40 in Embodiment 4 when the shape of the segments is a honeycomb structure. The LED 31 is placed in the center of the hexagonal segment viewed in the plane. The yellow shift countermeasure with the color conversion sheet 40 in FIG. 15 is the same as that described in Embodiment 1. That is, in FIG. 15, the ring-shaped area between the inner and outer circles is the area where no QDs 41 are formed. This reduces the yellow shift as explained in FIG. 10 of Embodiment 1. The feature of FIG. 15 is that the shape of the segments is similar to a circle, so that the yellow shift can be counteracted more uniformly than in Embodiment 1.

Embodiment 2 can be applied to segments of honeycomb structure in the same way as Embodiment 1. The principle of the countermeasure is also the same as that explained in Embodiment 2. If the configuration described in Embodiment 2 is applied to segments with a honeycomb structure, a more uniform yellow shift countermeasure can be applied.

Figure 16:
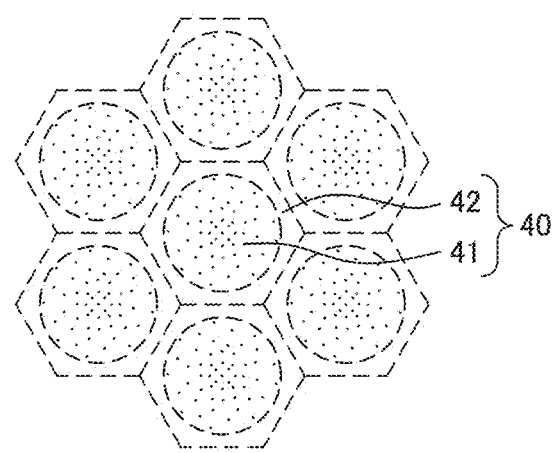
FIG. 16 is another plan view of Embodiment 4.

FIG. 16 is a plan view of the color conversion sheet 40 when the configuration of Embodiment 3 is applied to a honeycomb structure. Viewed in a plane, LED 31 is placed in the center of the hexagonal segments. The yellow shift countermeasure using the color conversion sheet 40 in FIG. 16 is the same as described in Embodiment 3. That is, viewed in a plan view, the amount of QDs 41 decreases from the center to the periphery inside the circle in FIG. 16. The decrease in the amount of QDs 41 does not mean that the density of QDs 41 is decreasing, but rather that the range in the direction of the thickness of the color conversion sheet 40 in the area where QDs 41 are formed is changing, as depicted in FIG. 14 of Embodiment 3.

The configuration of FIG. 16 can reduce the yellow shift, as explained in FIG. 14 of Embodiment 3. The feature of FIG. 16 is that the shape of the segments is close to a circle, which allows for the more uniform yellow shift countermeasures than in Embodiment 3.

In the embodiments described above, the color conversion sheet 40 is placed directly on the transparent resin 32 covering the LED 31. The invention is not limited to this, but can also be applied to a configuration in which a dichroic sheet, or a polycarbonate sheet for controlling optical density (OD value), or the like is placed between the LED 31 and the color conversion sheet 40. The dichroic sheet makes the light from the LEDs have a sharper spectrum, so that wavelength conversion by the color conversion sheet is more accurate.

In the above, the case where a QD sheet is used as the color conversion sheet 40 has been described. However, the invention is not limited to the QD sheet, but can also be applied to the case of a color conversion sheet using phosphor dots.

What is claimed is:

1. A display device comprising:
   a display panel; and
   a backlight disposed at a lower side of the display panel, the backlight including a plurality of light emitting diodes arranged on a substrate, a transparent resin covering upper surfaces of the plurality of light emitting diodes, side surfaces of the plurality of light emitting diodes and the substrate, and a color conversion sheet arranged between the transparent resin and the display panel,
   a lower surface of the color conversion sheet facing the upper surfaces of the plurality of light emitting diodes,
   the color conversion sheet being formed of color conversion material and a binder, and
   the color conversion sheet having the color conversion material within a first circle centered on each of the plurality of light emitting diodes as viewed in a plane, and having an area outside the first circle in which no color conversion material is present in a ring shape, the color conversion material being dispersed throughout an entirety of the color conversion sheet except for the area.

2. The display device according to claim 1, wherein the color conversion material includes a quantum dot.

3. The display device according to claim 1, wherein the plurality of light emitting diodes include blue light emitting diodes.

4. The display device according to claim 1, wherein
   the amount of the color conversion material is greater at the center of the first circle than at the periphery of the first circle, viewed in a plane.

5. The display device according to claim 4, wherein the color conversion material includes a quantum dot.

6. The display device according to claim 4, wherein the plurality of light emitting diodes include blue light emitting diodes.

7. The display device according to claim 1, wherein the plurality of light emitting diodes are arranged on the substrate at the vertices of a square.

8. The display device according to claim 1, wherein the plurality of light emitting diodes are arranged at the vertices of an equilateral triangle on the substrate.

* * * * *